United States Patent
Zheng

(10) Patent No.: US 10,791,726 B2
(45) Date of Patent: Oct. 6, 2020

(54) MOSQUITO-KILLING DEVICE

(71) Applicant: Ningbo Dayang Industry and Trade Co., Ltd., Zhejiang (CN)

(72) Inventor: Jun Zheng, Zhejiang (CN)

( * ) Notice: Subject to any disclaimer, the term of this patent is extended or adjusted under 35 U.S.C. 154(b) by 408 days.

(21) Appl. No.: 15/823,615

(22) Filed: Nov. 28, 2017

(65) Prior Publication Data

US 2019/0159440 A1  May 30, 2019

(51) Int. Cl.
| | | |
|---|---|---|
| *A01M 1/06* | (2006.01) | |
| *C25B 9/06* | (2006.01) | |
| *C25B 11/12* | (2006.01) | |
| *A01M 1/22* | (2006.01) | |
| *C25B 1/00* | (2006.01) | |
| *A01M 1/02* | (2006.01) | |

(52) U.S. Cl.
CPC .............. *A01M 1/06* (2013.01); *A01M 1/023* (2013.01); *A01M 1/223* (2013.01); *C25B 1/00* (2013.01); *C25B 9/06* (2013.01); *C25B 11/12* (2013.01)

(58) Field of Classification Search
CPC ......... A01M 1/06; A01M 1/023; A01M 1/223
USPC .................................................... 43/139, 112
See application file for complete search history.

(56) References Cited

U.S. PATENT DOCUMENTS

| | | | | |
|---|---|---|---|---|
| 5,669,176 A * | 9/1997 | Miller | ................... | A01M 1/023 43/107 |
| 6,286,249 B1 * | 9/2001 | Miller | ..................... | A01M 1/02 43/113 |
| 8,109,036 B1 * | 2/2012 | Wilbanks | ............... | A01M 1/023 43/112 |
| 9,807,996 B1 * | 11/2017 | Yu | ........................... | A01M 1/08 |
| 2005/0011110 A1 * | 1/2005 | Lin | ........................ | A01M 1/023 43/122 |
| 2005/0060926 A1 * | 3/2005 | Lee | .......................... | A01M 1/08 43/113 |
| 2005/0126068 A1 * | 6/2005 | Welch | ................... | A01M 1/023 43/112 |
| 2007/0256351 A1 * | 11/2007 | Milton | ..................... | A01M 1/08 43/139 |
| 2010/0229459 A1 * | 9/2010 | Simchoni-Barak | .... | A01N 31/02 43/112 |
| 2014/0137462 A1 * | 5/2014 | Rocha | ...................... | A01M 1/08 43/113 |
| 2014/0165452 A1 * | 6/2014 | Rocha | ...................... | A01M 1/06 43/113 |
| 2018/0206472 A1 * | 7/2018 | Maxik | ................... | A01M 1/026 |
| 2018/0288993 A1 * | 10/2018 | Focks | ..................... | A01M 1/06 |
| 2018/0310542 A1 * | 11/2018 | Pearce | .................. | A01M 1/023 |
| 2019/0008132 A1 * | 1/2019 | Eom | ........................ | F21V 7/22 |

FOREIGN PATENT DOCUMENTS

CA  2340584 A1 *  9/2002  ............ A01M 1/223

* cited by examiner

*Primary Examiner* — Christopher P Ellis
(74) *Attorney, Agent, or Firm* — Prakash Nama; Global IP Services, PLLC

(57) ABSTRACT

The present invention relates to a mosquito-killing device, characterized in that it comprises a casing and a control unit; the casing is provided with a first opening for mosquitoes and insects to enter; a carbon dioxide generating device, a fan and an electric grid are provided inside the casing; the control unit controls operation of the carbon dioxide generating device, the fan and the electric grid.

8 Claims, 7 Drawing Sheets

MOSQUITO-KILLING DEVICE

BACKGROUND OF THE INVENTION

The present invention relates to a mosquito-killing device.

Existing mosquito-killing devices mainly utilize lights to lure and kill mosquitoes by electrocution. However, they require continuous lighting and thus affect resting at night. Carbon dioxide has a strong attracting force towards mosquitoes and insects. Therefore, people invented carbon dioxide generator to generate carbon dioxide for luring mosquitoes and insects. For example, a luring and killing device for mosquitoes and insects published under publication number CN105831040 on the website of the Chinese Intellectual Property Office comprises a carbon dioxide generator for luring mosquitoes and insects. The carbon dioxide generator is provided inside a box body. The box body is further provided with mosquito-killing components for killing mosquitoes and insects. The mosquito-killing components are high-voltage mosquito electrocution components. The high-voltage mosquito electrocution components are provided at a middle position in a bottom of the box body. Some mosquitoes could still escape from the mosquito-killing device after flying into the box body, and some mosquitoes simply fly around the mosquito-killing device. The mosquito-killing effect is not thorough for such mosquito-killing device in the prior art.

BRIEF SUMMARY OF THE INVENTION

In view of the aforesaid disadvantages now present in the prior art, the present invention provides a mosquito-killing device with good mosquito-killing effect which can effectively prevent mosquitoes from escaping and prevent users from being bit by mosquitoes.

To attain this, the present invention provides a mosquito-killing device which comprises a casing and a control unit. The casing is provided with a first opening for mosquitoes and insects to enter. A carbon dioxide generating device, a fan and an electric grid are provided inside the casing. The control unit controls operation of the carbon dioxide generating device, the fan and the electric grid.

With the aforementioned structure, the mosquito-killing device of the present invention has the following advantages in comparison with the prior art:

The carbon dioxide generating device of the mosquito-killing device of the present invention releases carbon dioxide for luring mosquitoes and insects into the casing; the fan sucks the mosquitoes and insects near the first opening into the casing and dries them to death; the electric grid kills the mosquitoes and insects inside the casing by electrocution. The mosquito-killing device therefore has better mosquito-killing effect and effectively prevents mosquitoes from escaping; users are prevented from being bit by mosquitoes.

As an improvement, the fan, the electric grid and the carbon dioxide generating device are arranged sequentially from top to bottom in the casing. The electric grid is positioned at an air outlet side of the fan. The first opening is positioned above an air inlet side of the fan. With the aforementioned structure, the arrangement of the fan, the electric grid and the carbon dioxide generating device is more reasonable. The carbon dioxide released by the carbon dioxide generating device spreads in the surrounding of the device under the action of the fan. The fan sucks in the mosquitoes from the air inlet side and directs the mosquitoes to the electric grid from the air outlet side. The electric grid directly kills the mosquitoes by electrocution. The mosquito-killing effect is better.

As an improvement, the casing comprises an upper casing and a base. The upper casing and the base are removably connected. The fan and the electric grid are provided inside the upper casing. The carbon dioxide generating device is provided on the base. With the aforementioned structure, the assembly of the upper casing and the base is more convenient. Maintenance and replacement of the inner components are also more convenient.

As an improvement, the upper casing has an open upper end and an open lower end. The open upper end of the upper casing is for the mosquitoes and insects to enter. The open lower end of the upper casing is connected to the base. The open upper end of the upper casing serves as an air inlet. A gap is provided between the open lower end of the upper casing and the base. The gap serves as an air outlet. With the aforementioned structure, the structure design is more reasonable. Air blows in from the air inlet to suck the mosquitoes into the casing, and then blows out from the air outlet to spread carbon dioxide in the surrounding of the casing.

As an improvement, a mosquito-attracting guiding board assembly is provided inside the open upper end of the upper casing. The mosquito-attracting guiding board assembly is provided with a second opening. An outer wall of the mosquito-attracting guiding board assembly is connected to an inner wall of the open upper end of the upper casing. An inner side wall of the second opening is connected to an outer side wall of the fan. With the aforementioned structure, after mosquitoes enter the casing they could only pass through the second opening, thus ensuring all the mosquitoes have to pass through the fan.

As an improvement, the mosquito-attracting guiding board assembly comprises a mosquito-attracting grid and a mosquito-attracting guiding board. An outer side wall of the mosquito-attracting grid is connected to the inner wall of the open upper end of the upper casing. The mosquito-attracting guiding board is positioned at a lower end of the mosquito-attracting grid. The second opening is provided on the mosquito-attracting guiding board. With the aforementioned structure, the present invention is simple in structure and convenient to assemble.

As an improvement, the mosquito-attracting guiding board forms a conical surface which tapers downward from an outer side towards an inner side. With the aforementioned structure, mosquitoes could fall into the fan more smoothly.

As an improvement, the electric grid comprises a body and a support. The support comprises a connecting frame and a conical stand which are connected with each other. The connecting frame is connected to the air outlet side of the fan. The body is provided on the conical stand. The conical stand is positioned at a lower side of the fan. A mosquito-passing opening is provided at a lower end of the conical stand. With the aforementioned structure, mosquitoes which are blown out from the air outlet side of the fan will pass through the electric grid and will be killed by the electric grid by electrocution, thus effectively prevent mosquitoes from escaping. Dead mosquitoes drop from the mosquito-passing opening into the casing.

As an improvement, a mosquito-collecting container is removably connected to the open lower end of the upper casing. The mosquito-collecting container is positioned below the electric grid and above the carbon dioxide generating device. The mosquito-collecting container has a bottom plate with a plurality of ventilation holes. With the aforementioned structure, when the mosquitoes in the mosquito-collecting container reach a certain amount, the mosquito-collecting container may be removed and the mosquitoes therein may be removed, thus it is very convenient to use.

As an improvement, the carbon dioxide generating device is removably connected on the base. The carbon dioxide generating device comprises a box body and electrolysis components. The electrolysis components are provided inside the box body. An electrolyte solution is provided inside the box body. The box body is provided with a venting hole. The electrolysis components comprise a graphite electrode and a cathode plate. With the aforementioned structure, the carbon dioxide generating device is simple in structure, has better carbon dioxide releasing effect, and is safe and environmental-friendly.

In the figures, 1 denotes the casing; 101 denotes the first opening; 102 denotes the upper casing; 103 denotes the base; 104 denotes the protrusions; 105 denotes the slots; 106 denotes the ventilation slots; 107 denotes the installation groove; 108 denotes the L-shaped channels; 109 denotes the first pair of positive and negative terminals; 2 denotes the carbon dioxide generating device; 201 denotes the box body; 202 denotes the cover; 203 denotes the graphite electrode; 204 denotes the cathode plate; 205 denotes the venting hole; 206 denotes the limiting rods; 207 denotes the second pair of positive and negative terminals; 3 denotes the fan; 301 denotes the fan blade; 302 denotes the support; 4 denotes the electric grid; 402 denotes the body; 402 denotes the connecting frame; 403 denotes the conical stand; 404 denotes the mosquito-passing opening; 5 denotes the mosquito-attracting grid; 501 denotes the motor installation groove; 6 denotes the mosquito-attracting guiding board; 601 denotes the second opening; 7 denotes the control panel; 701 denotes the switch; 8 denotes the mosquito-collecting container; 801 denotes the ventilation holes; 802 denotes the notch; 901 denotes the connecting shafts; 902 denotes the limiting lugs.

DETAILED DESCRIPTION OF THE INVENTION

The present invention is further described with a preferred embodiment and the accompanying drawings, but the present invention is not limited thereby.

Figure 1:
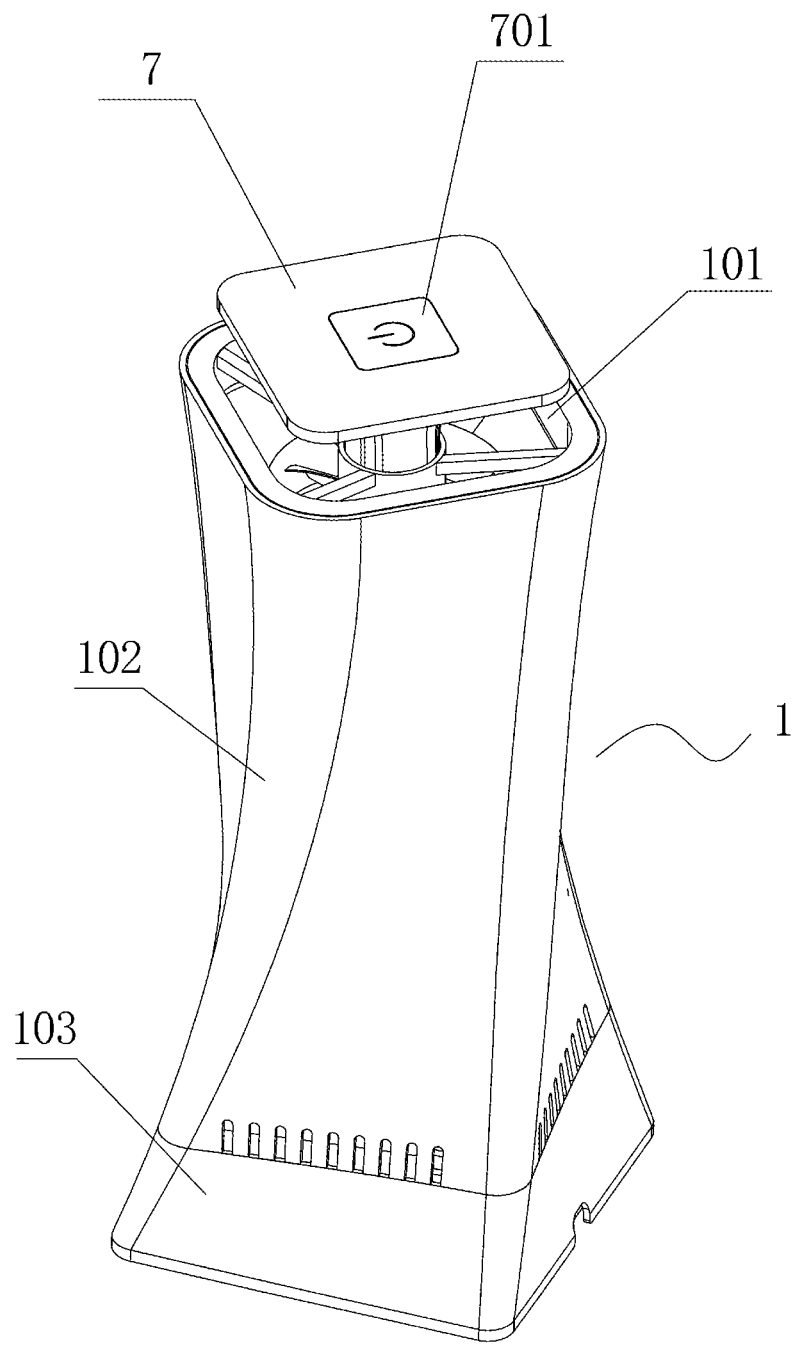
FIG. 1 is a perspective view of the mosquito-killing device of the present invention.

As illustrated in FIG. 1, the mosquito-killing device of the present invention comprises a casing 1 and a control unit. The casing 1 is provided with a first opening 101 for mosquitoes and insects to enter. A carbon dioxide generating device 2, a fan 3 and an electric grid 4 are provided inside the casing 1. The control unit controls operation of the carbon dioxide generating device 2, the fan 3 and the electric grid 4.

The carbon dioxide generating device 2 releases carbon dioxide, and carbon dioxide can lure mosquitoes and insects. The fan 3 rapidly sucks the mosquitoes and insects outside the first opening 101 into the casing 1. The electric grid 4 kills the mosquitoes and insects inside the casing 1 by electrocution.

Figure 2:
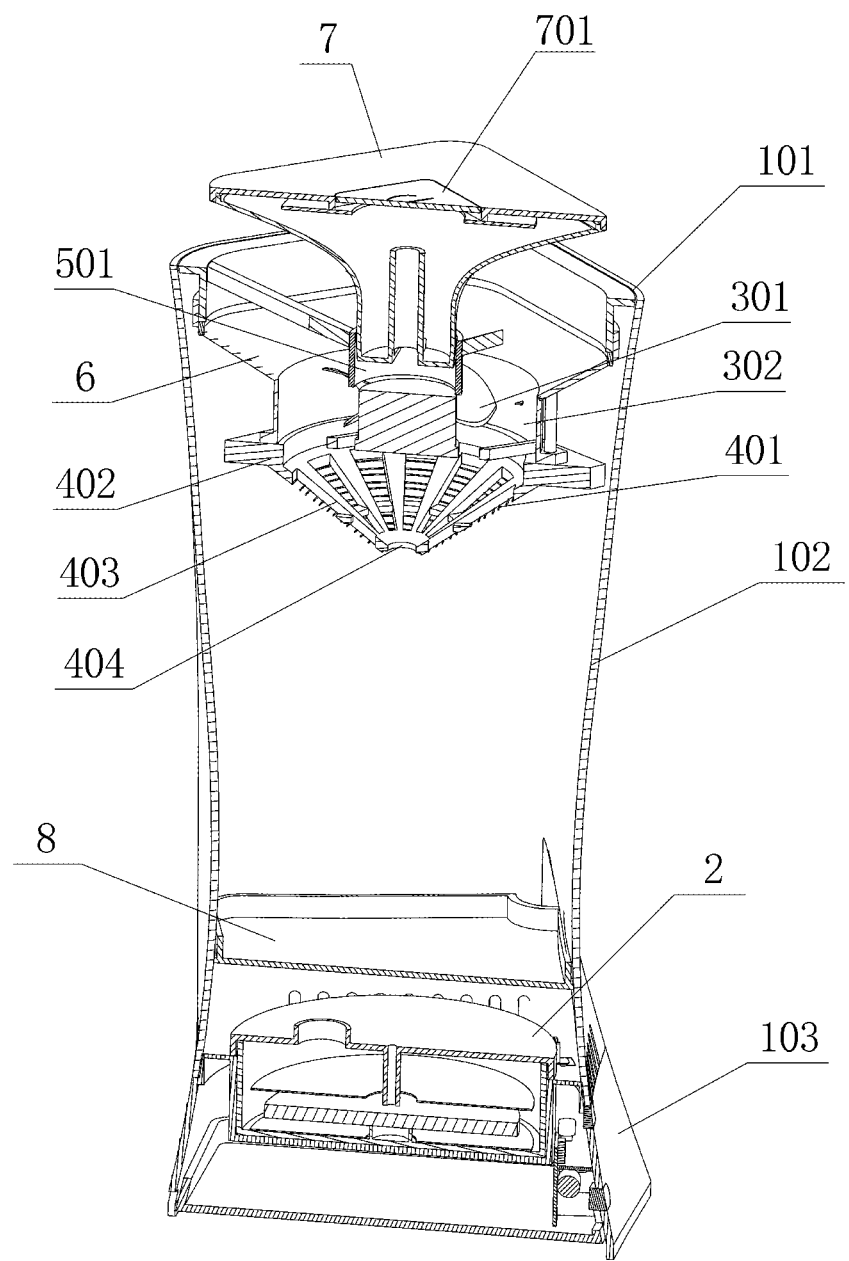
FIG. 2 is a sectional view of the mosquito-killing device of the present invention.
Figure 3:
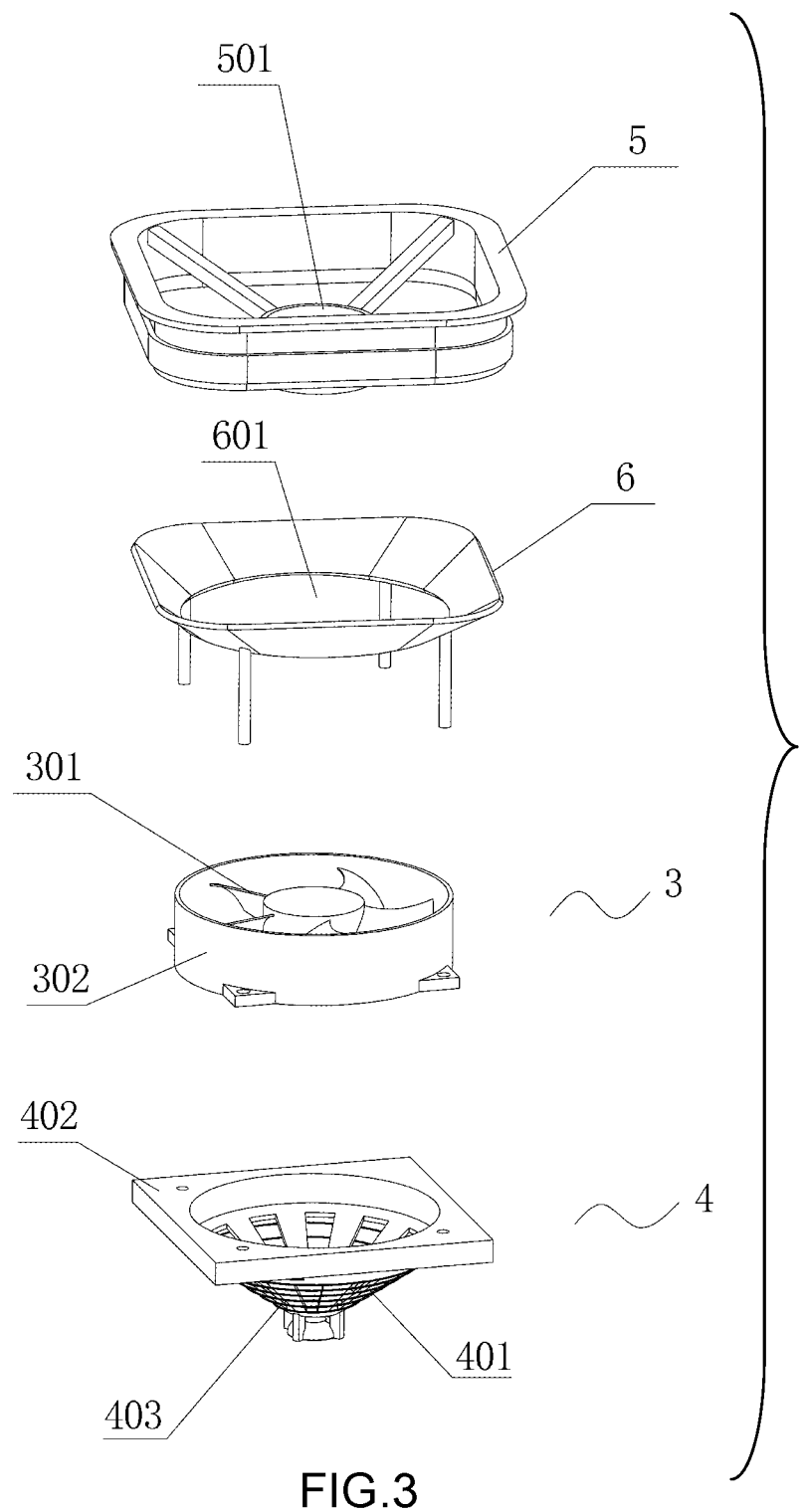
FIG. 3 is a disassembling view of the mosquito-attracting guiding board assembly, the fan and the electric grid of the mosquito-killing device of the present invention.

Based on the above structure, the present invention provides further improvements as follows:

As illustrated in FIGS. 2 to 3, the fan 3, the electric grid 4 and the carbon dioxide generating device 2 are arranged sequentially from top to bottom in the casing 1. The electric grid 4 is positioned at an air outlet side of the fan 3. The first opening 101 is positioned above an air inlet side of the fan 3.

The casing 1 comprises an upper casing 102 and a base 103. The upper casing 102 and the base 103 are removably connected. The fan 3 and the electric grid 4 are provided inside the upper casing 102. The carbon dioxide generating device 2 is provided on the base 103. The upper casing 102 has an open upper end and an open lower end. The open upper end of the upper casing 102 is for the mosquitoes and insects to enter. The open lower end of the upper casing 102 is connected to the base 103. The open upper end of the upper casing 102 serves as an air inlet. A gap is provided between the open lower end of the upper casing 102 and the base 103. The gap serves as an air outlet. An inner wall of the open lower end of the upper casing 102 is provided with protrusions 104. A side wall of an upper end of the base 102 is provided with slots 105. When the upper casing 102 is mounted on the base 103, the protrusions 104 engage with the slots 105. A side wall of the open lower end of the upper casing 102 is provided with a plurality of ventilation slots 106. The ventilation slots 106 form part of the air outlet.

A mosquito-attracting guiding board assembly is provided inside the open upper end of the upper casing 102. The mosquito-attracting guiding board assembly is provided with a second opening 601. An outer wall of the mosquito-attracting guiding board assembly is connected to an inner wall of the open upper end of the upper casing 102. An inner side wall of the second opening 601 is connected to an outer side wall of the fan 3. The mosquito-attracting guiding board assembly comprises a mosquito-attracting grid 5 and a mosquito-attracting guiding board 6. An outer side wall of the mosquito-attracting grid 5 is connected to the inner wall of the open upper end of the upper casing 102. The mosquito-attracting guiding board 6 is positioned at a lower end of the mosquito-attracting grid 5. The second opening 601 is provided on the mosquito-attracting guiding board 6. The mosquito-attracting guiding board 6 forms a conical surface which tapers downward from an outer side towards an inner side.

The fan 3 comprises a fan blade 301, a motor assembly and a frame 302. The fan blade 301 is provided in a middle portion of the frame 302. An outer side wall of the frame 302 is connected to the inner side wall of the second opening 601. With the aforementioned structure, when the fan 3 operates, air could only pass from the fan blade 301, thus mosquitoes and insects are effectively sucked into the casing 1; and the mosquitoes and insects which are sucked into the casing 1 could only exit via the air outlet side, where all mosquitoes and insects will pass through the electric grid and be killed by electrocution. The mosquito-killing effect is better, and mosquitoes are prevented from escaping. A motor installation groove 501 is provided in a middle portion of the mosquito-attracting grid 5. The motor assembly is installed in the motor installation groove 501. An upper side of the upper casing 102 is further provided with a control panel 7. The control panel 7 is fixedly connected to an installation groove 107. A control switch 701 is provided on the control panel 7. A control circuit is provided inside the control panel 7. The control circuit is connected to a circuit of the motor assembly. The control circuit drives operation of the motor assembly. The switch 701 activates the control circuit and the motor assembly.

The electric grid 4 comprises a body 4 and a support. The support comprises a connecting frame 402 and a conical stand 403 which are connected with each other. The connecting frame 402 is connected to the air outlet side of the fan 3. The body 401 is provided on the conical stand 403. The conical stand 403 is positioned at a lower side of the fan 3. A mosquito-passing opening 404 is provided at a lower end of the conical stand 403. With the aforementioned structure, mosquitoes could be prevented from escaping from the connecting area between the electric grid 4 and the motor 3. Mosquitoes blown out from the air outlet side of the fan 3 pass through the electric grid 4 and are killed by electrocution, which are then directed to the mosquito-passing opening 404 by the conical stand 403 and thereafter fall into the casing 1 from the mosquito-passing opening 404.

Figure 4:
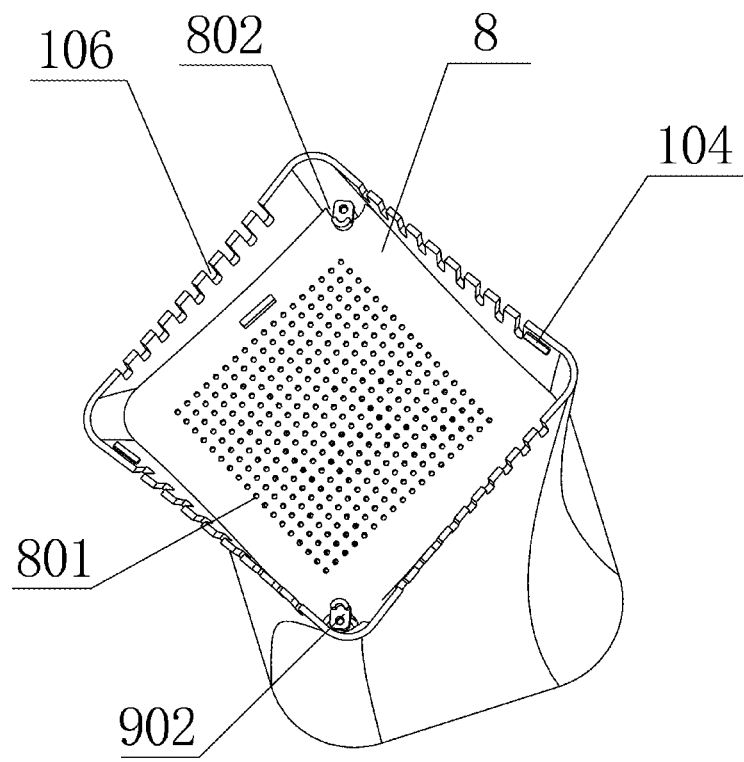
FIG. 4 is a perspective view showing the mosquito-collecting container of the mosquito-killing device of the present invention being assembled on the upper casing.
Figure 5:
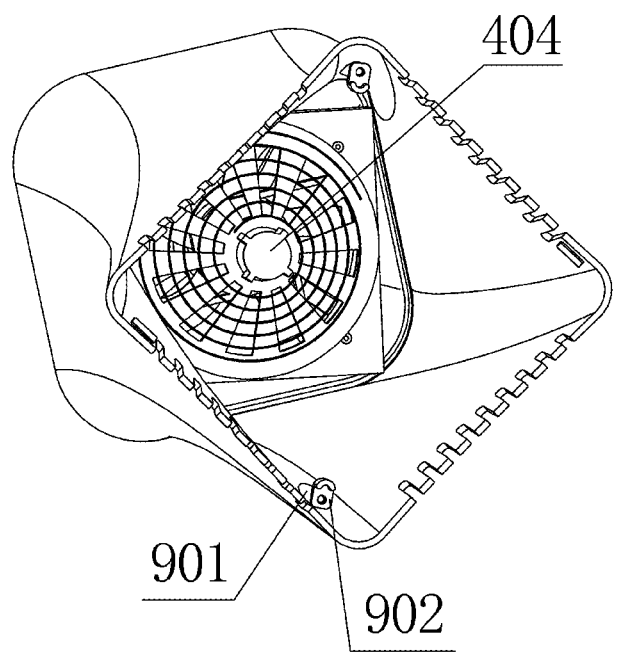
FIG. 5 is a perspective view of the upper casing of the mosquito-killing device of the present invention.
Figure 6:
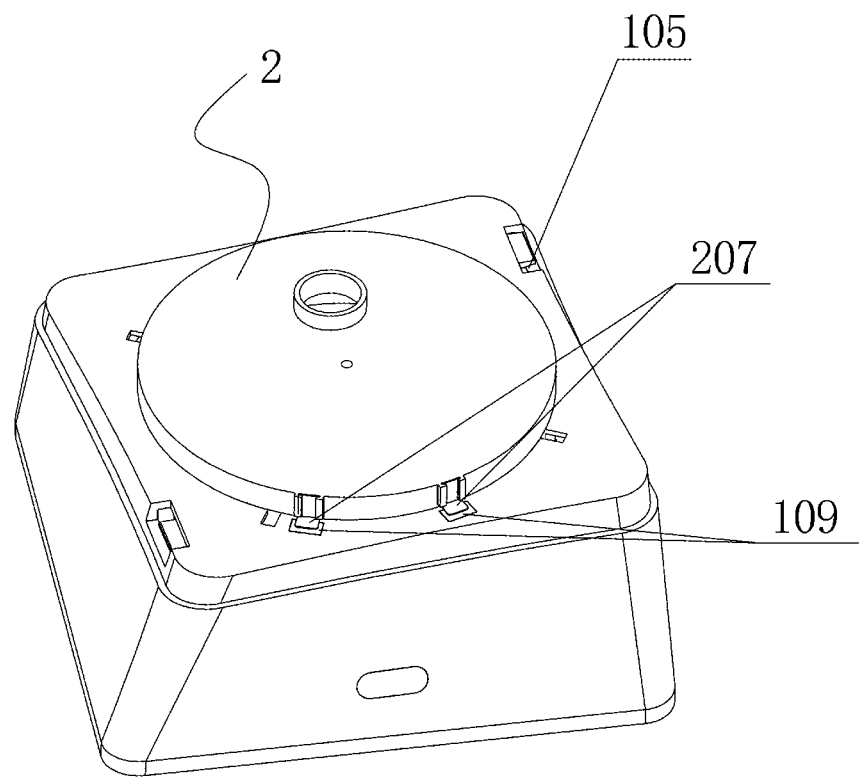
FIG. 6 is a perspective view showing the carbon dioxide generating device of the mosquito-killing device of the present invention being assembled on the base.
Figure 7:
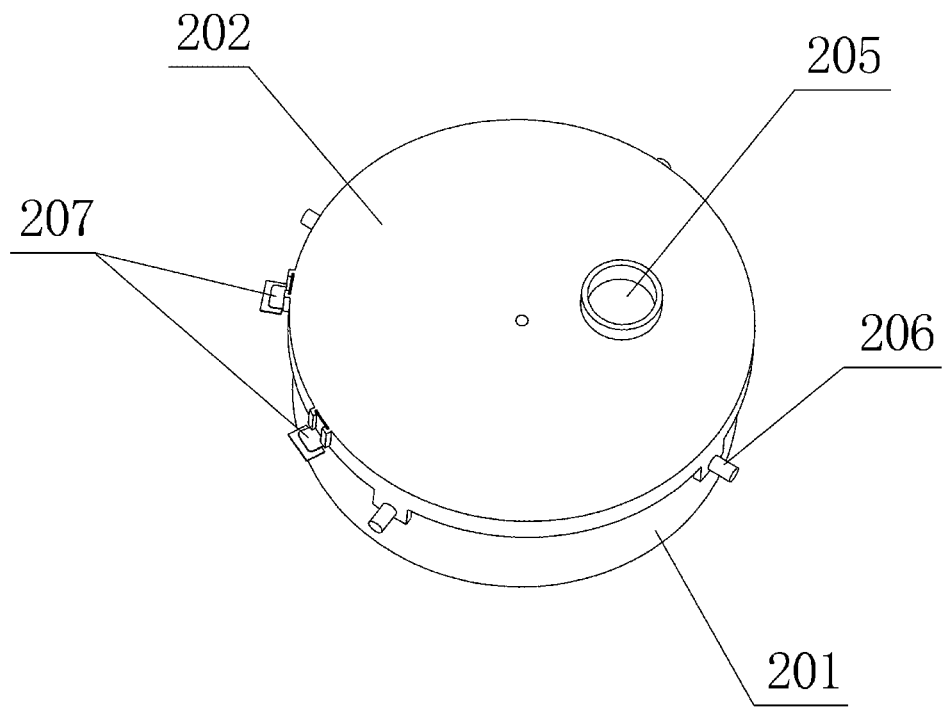
FIG. 7 is a perspective view of the carbon dioxide generating device of the mosquito-killing device of the present invention.
Figure 8:
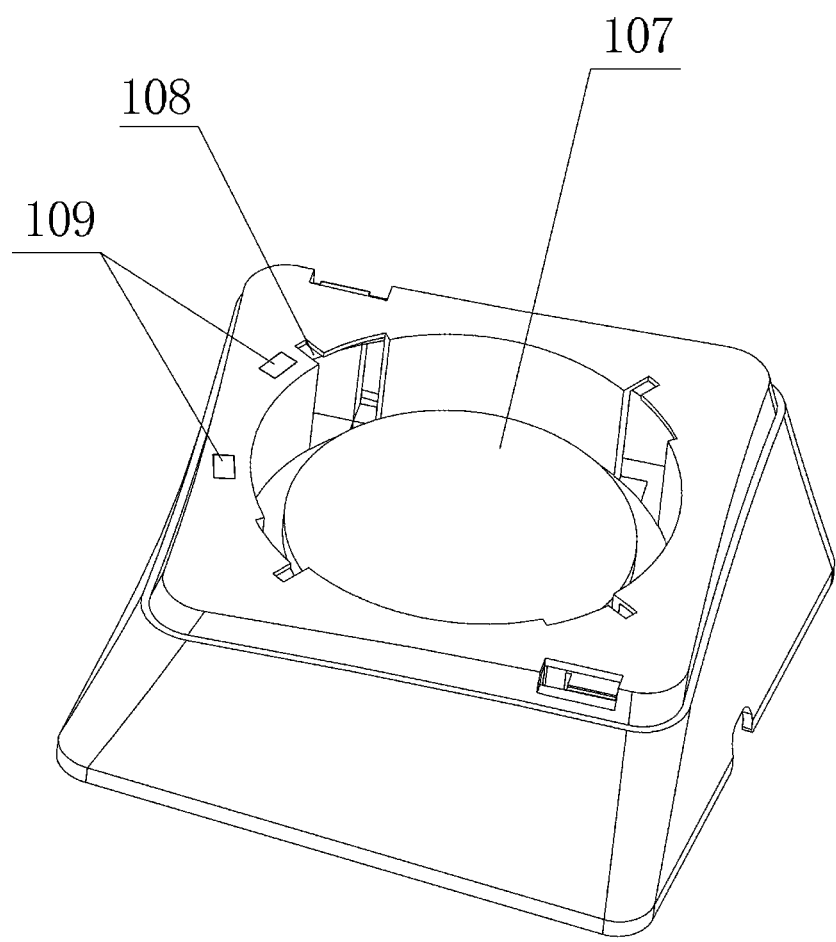
FIG. 8 is a perspective view of the base of the mosquito-killing device of the present invention.
Figure 9:
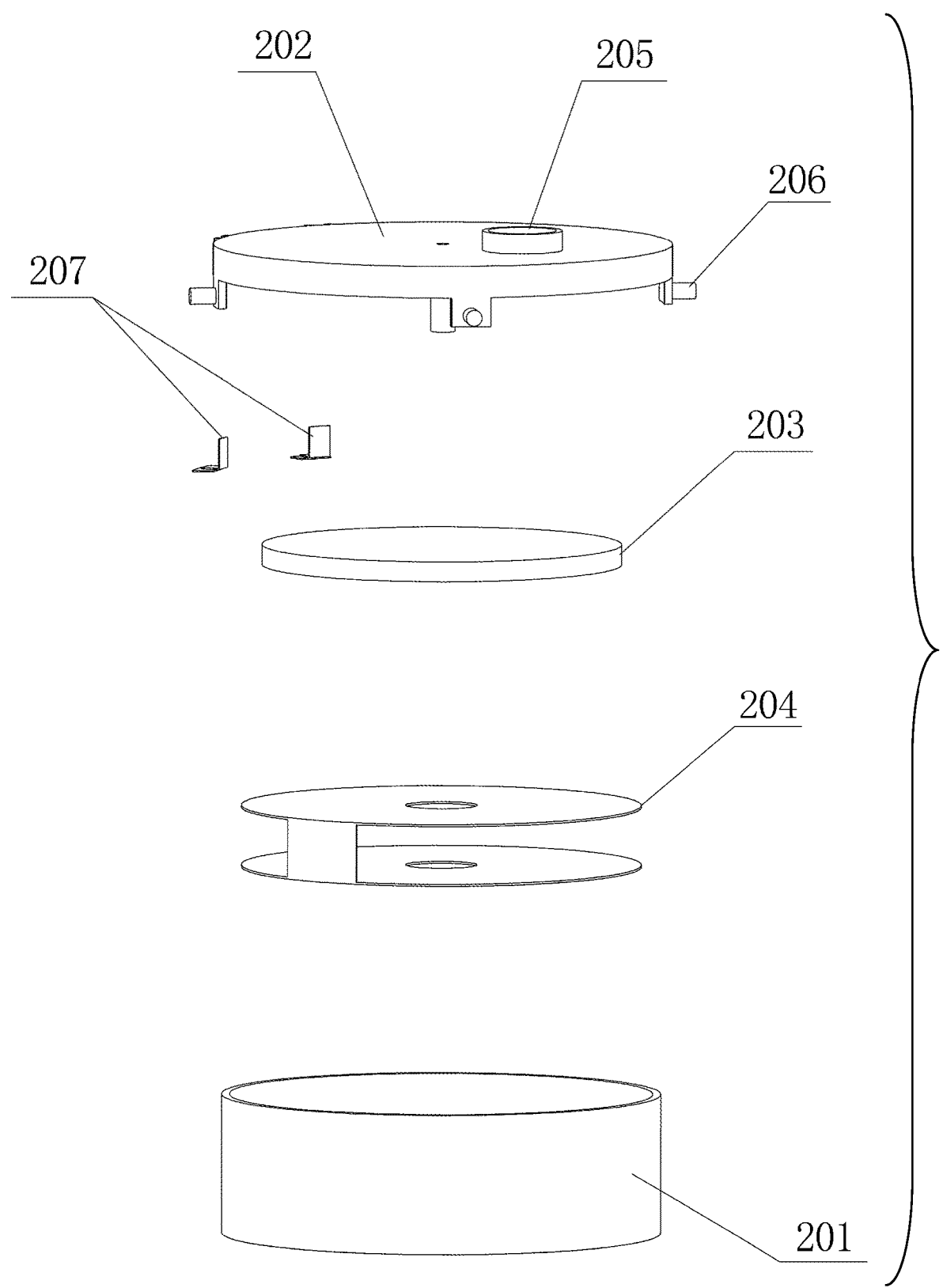
FIG. 9 is a disassembling view of the carbon dioxide generating device of the mosquito-killing device of the present invention.

As illustrated in FIGS. 4 and 5, a mosquito-collecting container 8 is removably connected to the open lower end of the upper casing 102. The mosquito-collecting container 8 is positioned below the electric grid 4 and above the carbon dioxide generating device 2. The mosquito-collecting container 8 has a bottom plate with a plurality of ventilation holes 801. The mosquito-collecting container 8 has a shape which corresponds to an inner cavity of the open lower end of the upper casing 102. The mosquito-collecting container 8 has an edge with notches 802. A fixing bracket is provided on an inner wall of the open lower end of the upper casing 102. The fixing bracket comprises a connecting shaft 901 and a limiting lug 902. The limiting lug 902 pivotally connected at a lower end of the connecting shaft 901. An upper end of the connecting shaft 901 is fixed on the inner wall of the open lower end of the upper casing 102. When the mosquito-collecting container 8 is mounted in the open lower end of the upper casing 102, the limiting lug 902 rests on a lower side of a side wall of the notch 802 of the mosquito-collecting container 8. To remove the mosquito-collecting container, rotate the limiting lug 902 until the limiting lug 902 moves away from the side wall of the mosquito-collecting container 8 to position inside the notch 802, then remove the mosquito-collecting container 8 downwardly, and the notch 802 passes through the limiting lug 902. The structure is simple and disassembly and assembly are convenient. A mosquito-collecting container limiting structure is further provided on the upper casing 102 above the mosquito-collecting container 8. This is achieved by the upper casing 102 having a curved structure above the mosquito-collecting container 8. With the aforementioned structure, it is aesthetically pleasing and effectively limiting the position of the mosquito-collecting container.

As illustrated in FIGS. 6-9, the carbon dioxide generating device 2 is removably connected on the base 103. The installation groove 107 is provided on an upper surface of the base 103. The carbon dioxide generating device 2 is installed inside the installation groove 107. The carbon dioxide generating device 2 comprises a box body and electrolysis components. The electrolysis components are provided inside the box body. An electrolyte solution is provided inside the box body. The box body is provided with a venting hole 205. The electrolysis components comprise a graphite electrode 203 and a cathode plate 204. Limiting rods 206 are provided on an outer peripheral wall of the box body. L-shaped channels 108 are provided on a side wall of the installation groove 107. To install the carbon dioxide generating device 2, each of the limiting rods 206 is first inserted into a vertical channel of the corresponding channel 108; after reaching a certain position, rotate the carbon dioxide generating device 2 to insert each of the limiting rods 206 into a horizontal channel of the corresponding channel 108 to install the carbon dioxide generating device 2 securely into the installation groove 107. The upper surface of the base 103 is provided with a first pair of positive and negative terminals 109. A side wall of the carbon dioxide generating device 2 is provided with a second pair of positive and negative terminals 207. When the carbon dioxide generating device 2 is installed inside the installation groove 107, the first pair of positive and negative terminals 109 corresponds to the second pair of positive and negative terminals 207.

The box body comprises a body 201 and a cover 202. The graphite electrode 203 and the cathode plate are both provided inside the body 201. The electrolyte solution is provided inside the body 201. The venting hole 205 is provided on the cover 202. The graphite electrode 203 is connected to the positive terminal of the second pair of positive and negative terminal. The cathode plate 204 is connected to the negative terminal of the second pair of positive and negative terminal. The venting hole 205 is provided with a plug (not shown in the drawings) inside. The plug is provided with a cross-slit. The cross-slit of the plug prevents the electrolyte solution from spilling out from the venting hole 205 while allows discharge of carbon dioxide from the cross-slit. In other words, when the carbon dioxide in the box body reaches a certain amount, the air pressure in the box body increases, and the cross-slit is pushed open to discharge the carbon dioxide from the cross-slit. The carbon dioxide discharged from the carbon dioxide generating device is released from the gap between the base 103 and the upper casing 102 and the ventilation slots 106 by the wind blow from the fan 3 and spreads in the surrounding of the device, thus resulting in better mosquitoes and insects luring effects.

The graphite electrode comprises the following in weight percentage:

| | |
|---|---|
| Graphite powder | 50%-90% |
| Adhesive | 10%-40% |
| First additive | 1%-30% |
| Second additive | 0.1%-10% |

The adhesive comprises at least one of phenolic resin, bisphenol A epoxy resin and urea formaldehyde resin.

The first additive is selected from at least one of the following: polylactic acid, carbonate, monosaccharide, oligosaccharide and polymethacrylates.

The second additive is selected from at least one of the following: carbon black, carbon nanotubes, silicon carbide, boron nitride, silicon oxide, aluminium oxide, zinc oxide, iron oxide, titanium dioxide, calcium carbonate, stearic acid, zinc stearate and calcium stearate.

The graphite electrode further comprises hexamethylenetetramine. The hexamethylenetetramine is present in an amount of 5-15 weight percentage of the adhesive.

The manufacturing process of the graphite electrode comprises the following steps: Mixing all components evenly to obtain a mixture, and then heat pressing and curing the mixture in a mold under 100-300 degrees Celsius and 10-60 MPa to obtain the graphite electrode.

The electrolyte solution in the box body may select from any one in prior art according to needs. The electrolyte solution is an aqueous solution of sulfate and/or bicarbonate. The electrolyte solution further comprises 0-10 weight percentage of glucose. The electrolyte solution has a pH value of 6-9. The aforementioned electrolyte solution could interact with the graphite electrode to increase the carbon dioxide in the electrolytic gas. In particular, after adding glucose, the carbon dioxide in the electrolytic gas can be increased by about 2 v %.

When the graphite electrode with the aforementioned structure is used as the anode plate in the electrolytic cell of the carbon dioxide generating device 3, the carbon dioxide in the gas produced by electrolysis could reach 10 v %, and the gas produced is stable in quantity. It is especially suitable for use as consumables in mosquito-killing apparatus and plant growth apparatus. It is easy to replace, and has good energy saving and consumption reducing effects and is more environmental friendly.

The operating principle of the mosquito-killing device of the present invention is as follows: Activate the carbon dioxide generating device 2, the fan 3 and the electric grid 4. The carbon dioxide generating device 2 starts to release carbon dioxide. Under the action of the fan 3, carbon dioxide is continuously blown out from the connecting area between the upper casing 102 and the base 103, so that carbon dioxide spreads in the surrounding of the device. When mosquitoes and insects are near the air inlet, under the action of the fan 3, the mosquitoes and insects are sucked into the casing 1; the mosquitoes and insects pass through the fan blade 301 and are blown onto the electric grid 4. The electric grid 4 kills the mosquitoes and insects by electrocution. The dead mosquitoes and insects drop into the mosquito-collecting container 8. When the mosquitoes and insects in the mosquito-collecting container 8 reaches a certain amount, the user open the upper casing 102 and the base 103 and remove the mosquito-collecting container 8 to remove the mosquitoes and insects.

What is claimed is:

1. A mosquito-killing device, characterized in that it comprises a casing and a control unit; the casing is provided with a first opening for mosquitoes and insects to enter; a carbon dioxide generating device, a fan and an electric grid are provided inside the casing; the control unit controls operation of the carbon dioxide generating device, the fan and the electric grid; the fan, the electric grid and the carbon dioxide generating device are arranged sequentially from top to bottom in the casing; the electric grid is positioned at an air outlet side of the fan; the first opening is positioned above an air inlet side of the fan; the electric grid comprises a body and a support; the support comprises a connecting frame and a conical stand which are connected with each other; the connecting frame is connected to the air outlet side of the fan; the body is provided on the conical stand; the conical stand is positioned at a lower side of the fan; a mosquito-passing opening is provided at a lower end of the conical stand.

2. The mosquito-killing device as in claim 1, characterized in that the casing comprises an upper casing and a base; the upper casing and the base are removably connected; the fan and the electric grid are provided inside the upper casing; the carbon dioxide generating device is provided on the base.

3. The mosquito-killing device as in claim 2, characterized in that the upper casing has an open upper end and an open lower end; the open upper end of the upper casing is for the mosquitoes and insects to enter; the open lower end of the upper casing is connected to the base; the open upper end of the upper casing serves as an air inlet; a gap is provided between the open lower end of the upper casing and the base; the gap serves as an air outlet.

4. The mosquito-killing device as in claim 2, characterized in that a mosquito-attracting guiding board assembly is provided inside the open upper end of the upper casing; the mosquito-attracting guiding board assembly is provided with a second opening; an outer wall of the mosquito-attracting guiding board assembly is connected to an inner wall of the open upper end of the upper casing; an inner side wall of the second opening is connected to an outer side wall of the fan.

5. The mosquito-killing device as in claim 4, characterized in that the mosquito-attracting guiding board assembly comprises a mosquito-attracting grid and a mosquito-attracting guiding board; an outer side wall of the mosquito-attracting grid is connected to the inner wall of the open upper end of the upper casing; the mosquito-attracting guiding board is positioned at a lower end of the mosquito-attracting grid; the second opening is provided on the mosquito-attracting guiding board.

6. The mosquito-killing device as in claim 4, characterized in that the mosquito-attracting guiding board forms a conical surface which tapers downward from an outer side towards an inner side.

7. The mosquito-killing device as in claim 2, characterized in that a mosquito-collecting container is removably connected to the open lower end of the upper casing; the mosquito-collecting container is positioned below the electric grid and above the carbon dioxide generating device; the mosquito-collecting container has a bottom plate with a plurality of ventilation holes.

8. The mosquito-killing device as in claim 2, characterized in that the carbon dioxide generating device is removably connected on the base; the carbon dioxide generating device comprises a box body and electrolysis components; the electrolysis components are provided inside the box body; an electrolyte solution is provided inside the box body; the box body is provided with a venting hole; the electrolysis components comprise a graphite electrode and a cathode plate.

\* \* \* \* \*